United States Patent Office 3,448,899
Patented June 10, 1969

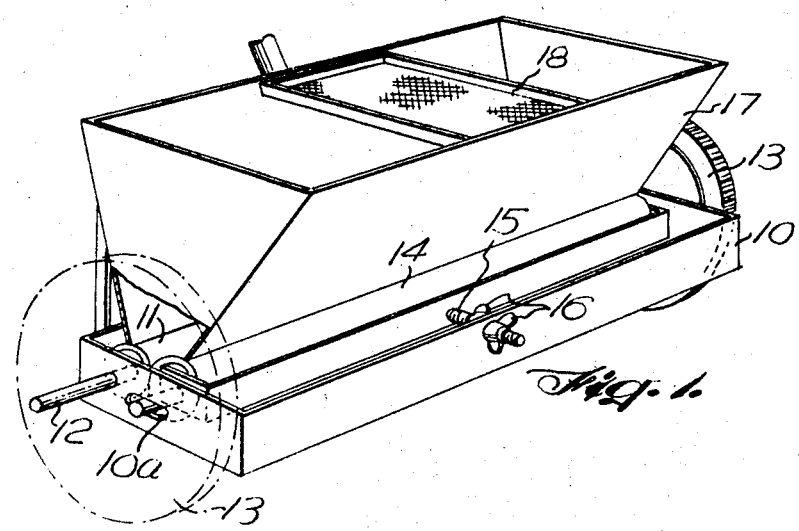
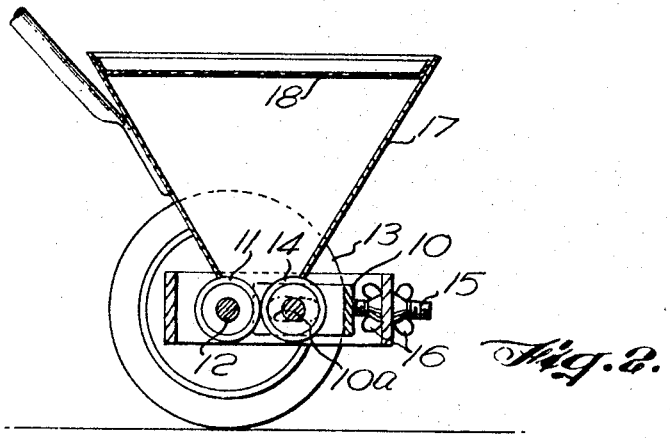
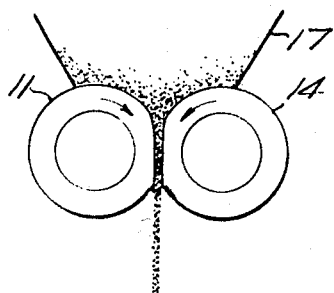
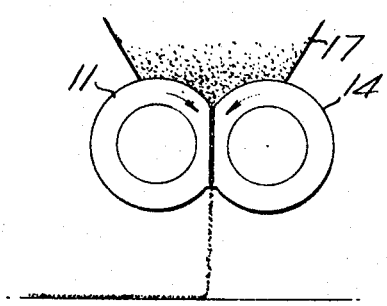

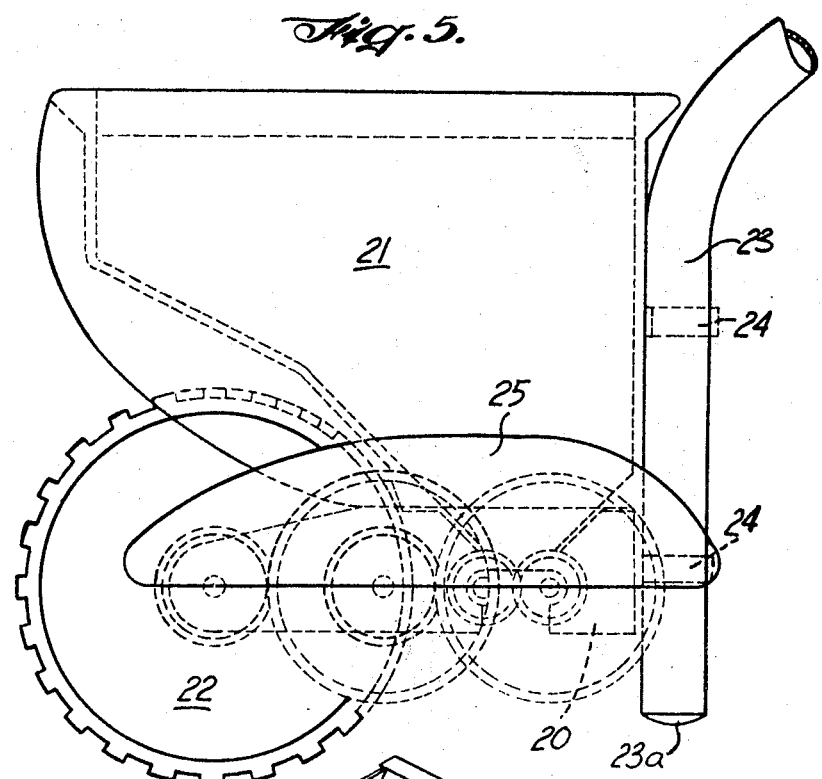

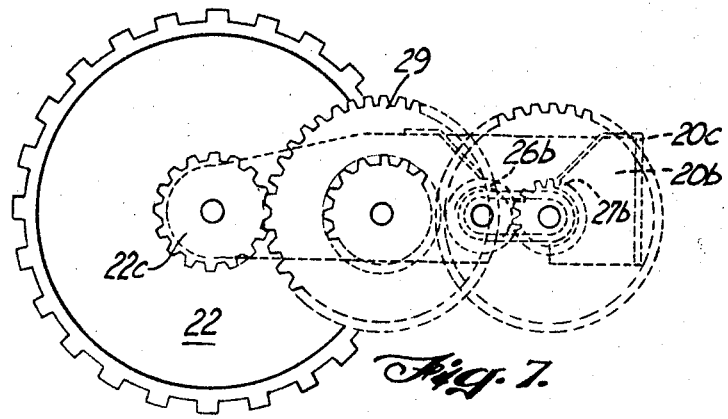
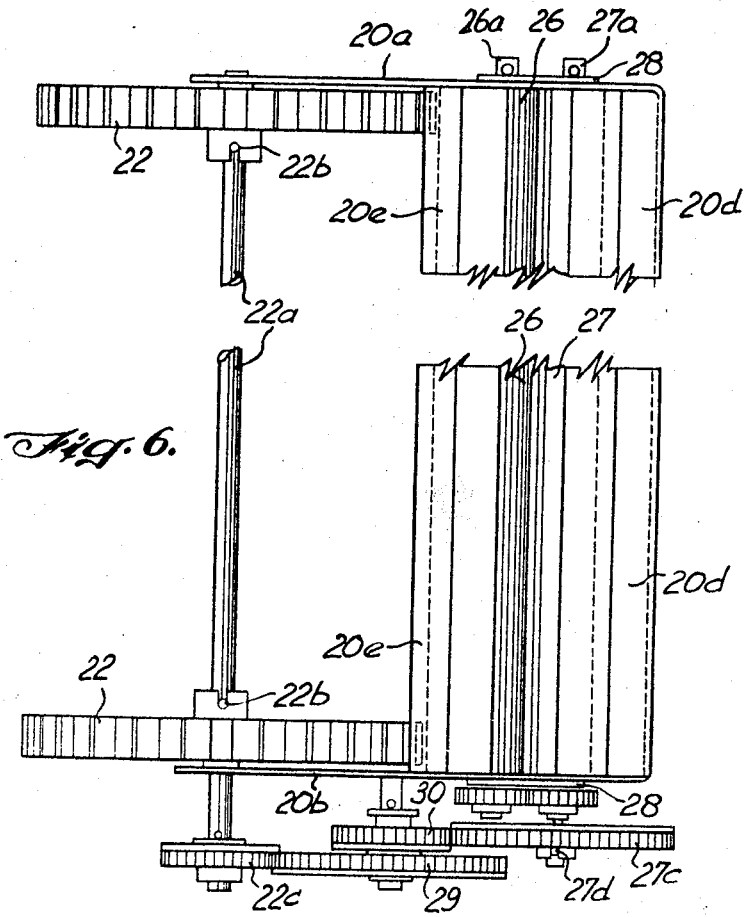

3,448,899
DISTRIBUTORS
Derek Burtt Hargreaves, Wych Cottage, Wych Lane, Adlington, near Macclesfield, England, and Eric Staniforth, Wood End Farm, Kerridge Road, Rainow, Macclesfield, England
Continuation-in-part of application Ser. No. 388,766, Aug. 11, 1966. This application Apr. 28, 1966, Ser. No. 546,079
Int. Cl. A01c 15/02, 15/08
U.S. Cl. 222—177                                14 Claims

ABSTRACT OF THE DISCLOSURE

A distributor for delivering powdered granular or like material onto the ground comprising a hopper having an outlet at its lower end, a pair of rollers providing a closure for such outlet one at least of which is resilient to provide a pressurised resilient roller-like nip for direct delivery of the material from between the rollers with their nip forming surfaces moving in the same direction and at the same speed. Delivery rate of material from hopper may be varied by varying pressure between rollers, or by varying speed of rollers with respect to speed of rotation of distributor wheels.

---

This application is a continuation-in-part of application Ser. No. 388,766, filed Aug. 11, 1964.

This invention relates to distributors for horticultural, agricultural and like purposes as for example to effect distribution of fertilizers or other granular or powdered material and including seed.

Various devices are known for this purpose including one which embodies a roller of resilient washer-like elements having axial concave peripheral surfaces, the concavity of which can be varied by axial pressure for adjustment of rate of delivery, the said periphery coacting with a metering edge, such as the longitudinal edges of the opening in the bottom of a hopper.

A fertilizer spreader and grain drill is also known from U.S. patent application No. 2,554,637 having resilient covered feed rollers mounted in adjustable bearings and normally in contact with each other and which also suggested change of speed of rotation for the rollers. No suggestion is made therein of pressurisation of the roller nip, nor is any reference made to the controlling effect on rate of delivery of the factors of pressurisation or speed of rotation. It is only now known that neither of these factors has a straight line characteristic relative to rate of delivery.

With the modern stress on accuracy of rate of delivery this prior art merely discloses the use of resilient covered rollers as a means for feeding material from a hopper and does not teach the use of such mechanism as a means of feeding material at a rate of delivery with the accuracy necessary for modern requirements of a distributor.

The possible use of a pressurised resilient roller-like nip, having the roller axles or equivalent held non-yieldingly so that the elements forming the roller-like nip are pressurised, and so that the resilience is provided only by the resilience of one or both of the surfaces forming the nip for providing a measured delivery as distinct from the use of spring-loaded rollers which by reason of permitted change of axial spacing obviously could not give measured delivery, was not predictable at the date of filing the application for Patent No. 388,766, of which the present application is a continuation-in-part. Equally, because of the semi-fluid characteristic of granular, powdered or particulate material, compared with non-fluid materials, such as textiles, the factor of peripheral speed as a useful variable is not predictable except that such factor was unlikely, as with non-fluid materials, to have a linear characteristic.

While it is also a reasonable assumption that in operation such distributors, whether manually or power driven, would mostly be operated at a substantially constant ground speed within reasonable tolerances for variation of ground speed and delivery rate and while this has been found satisfactory for some ratios of ground/peripheral speeds it does not follow that this would apply for different ratios of ground/peripheral speeds or that the use of a variable ratio could provide an alternative to, or supplementary to, variable pressurisation as a means for varying the rate of delivery.

The present invention is based also upon the appreciation of the aforesaid considerations and the results of experiment and research by the applicants for a means, alternative to variable pressurisation with its known limits and disadvantages, for enabling the rate of delivery to be adjustable.

One object of the invention is to enable the rate of delivery within acceptable tolerances to be varied without necessarily varying the pressurisation.

Another object of the present invention is to simplify the construction of a distributor having as aforesaid a pressurised resilient roller-like nip.

A still further object is to enable the parts to be assembled with a minimum of skill or labour, or to be dismantled easily for maintenance or repair. Yet another object of the invention is to enable many of the parts to be made from plastics material to simplify and reduce the weight and the cost of production, assembly and maintenance.

According to one feature of the invention a distributor for powdered, granular or like materials of the kind comprising a hopper adapted to be moved over the ground, and outlet from the hopper and conveyor means actuated with movement of the hopper for carrying material in the hopper through said outlet for deposition on the ground is characterised in that said conveyor means comprises a pressurised roller-like nip of resilient sponge-like material whereby the rate of delivery through the nip is a function of pressurisation thereat.

The expression "pressurised roller-like nip" is used herein to include, not only a pair of rollers each having resilient surfaces in mutual pressure contact but also a construction in which one roller may be relatively harder than the other or embodying a roller and a band, or two bands, one at least of the parts forming the nip having a resilient surface and arranged to provide a resilient roller-like nip.

According to another feature of the invention, a distributor as aforesaid is characterised by means for varying the ratio of ground/peripheral linear factors for varying the measured delivery for any predetermined pressurisation.

The distributor aforesaid may be further characterised in that the said means comprises change-speed gearing; or further characterised in that the change-speed gearing comprises interchangeable sets of gear wheels; or further characterised in that the ground wheels are used to drive the members providing the roller-like nip and are detachably mounted for changing with others of a different diameter; or further characterised by a chassis constructed for carrying at pre-set axial centres the members forming the said pressurised nip, the ground wheels and the intercoupling gearing; or further characterised in that the chassis is formed with bearing-receiving apertures of open geometric configuration; or further characterised in that the said apertures are T-shaped notches; or further characterised by alternative interchangeable bearing members having differently spaced axle bearings formed therein; or further characterised by axle bearing members formed of nylon; or further characterised by a manipulating handle having an extension adapted to form a rest for the distributor when not in use.

In the accompanying drawings:

FIG. 1 is a perspective view of one example of a distributor made in accordance with the present invention.

FIG. 2 is a cross section of the distributor shown in FIG. 1.

FIGS. 3 and 4 are diagrammatic views.

FIG. 5 is a general assembly side elevation of one example of a distributor made in accordance with the present invention and in size suitable for domestic garden uses.

FIG. 6 is a plan of the distributor shown in FIG. 5 but with the gear cover, hopper and manipulating handle removed.

FIG. 7 is a detail side elevation of the gearing and frame incorporated in the distributor of FIGS. 5 and 6.

FIG. 8 is an isometric view of the frame alone shown on a smaller scale.

FIG. 9 is an isometric view of the hopper alone shown on a smaller scale.

FIG. 10 is a detail view of a bearing plate for the roller axles.

As shown in the drawings the distributor comprises a rectangular frame 10 in which is mounted a roller 11 on the axle 12 of which are mounted ground wheels 13. Within the frame is a U-shaped sub-frame carrying a second roller 14, the axle ends of which are slidably located in slots 10a, of the main frame. In the centre of the sub-frame is a screw 15 passing through the main frame 10, on which are located a pair of wing nuts 16. Above the nip of the rollers is a hopper 17 the top of which is fitted with a sieve 18. The rollers are made of a suitable resilient e.g., foamed material such as foamed rubber and may be made up of a plurality of washer-like units.

In operation, the pressure between the surfaces of the two rollers is adjustable by means of the nuts 16 so that the rate of delivery at the nip is thereby adjustable. When the pressure is at a minimum the actual nip is substantially at the common diameter but the material is dragged into the nip to a thickness, as shown in FIG. 3, which will be a function of the resilience, of the rollers and the flow characteristic of the material. As is clearly seen on FIG. 4 when the nip pressure is high the angle of entry is wider and the less material will be dragged in by the function of the material on the rollers. A calibrated indicator may be fitted as a function of the nip pressure, or relative position of the axles, so that the roller position may be set to effect the desired rate of distribution for some known material.

Gearing, such as used in a mangle, may be provided between the two rollers to ensure their simultaneous and equal rotation and in a modification the surface of one of the rollers may have material-holding formations.

As shown in FIGS. 5 to 10 of the drawings, the distributor comprises a chassis which consists essentially of a U-shaped frame 20 (FIG. 8) supporting a hopper 21 and having a pair of ground wheels 22. A manipulating handle 23 is attached by stirrups 24 to the frame and hopper, the lower end of the handle extending below the frame and being provided with a plug 23a of suitable plastic material to act as a leg on which the device may rest when not in use. A half guard 25 is provided to cover the upper part of the gears described later.

The frame 20 (FIG. 8) is fabricated from steel and is basically of U-shape having a pair of side arms 20a, 20b and a back 20c. Across the top are secured a pair of angle members 20d and 20e which together form a shallow V support on which the hopper is located and secured in any suitable manner and the lower edges of which also define the hopper outlet relative to the delivery rollers having resilient rubber coverings respectively 26 and 27 (FIG. 6) of 20° shore hardness. The axles 26a and 27a respectively of these rollers are located in holes in a bearing plate 28 (FIG. 10) which is shaped for location in T-shaped slots 20f and 20g in the arms 20a and 20b of the frame and are secured therein on one side by the pinions 26b and 27b and on the other side by means of pins (not shown) located in holes shown in the ends of the shafts.

The ground wheels 22 are hard plastic mouldings, located on the inside of the frame arms and are secured to an axle 22a by pins 22b located in complementary notches in the hubs of the wheels. Such pins may be split-pins so that they can be removed to enable the wheels to be changed for others of a smaller or larger diameter or to replace a damaged one.

The roller axles 26a and 27a are connected by gear pinions 26b, 27b for equal and simultaneous rotation so that the part of their peripheries forming the resilient nip move at the same speed in the same direction. The roller axle 27a is extended beyond the other and carries a gear pinion 27c which is secured by a removable pin 27d located in a hole in the axle and in a complementary notch in the hub of the gear pinion. The axle 22a is also extended beyond the side arm 20b and is similarly detachably fitted with a smaller gear pinion 22c. The gear pinions 22c and 27c are coupled by further gear pinions 29 and 30 to form a compound gear train giving a speed ratio reduction as between the axles 22a and 27a. Such ratio may be changed by fitting an alternative set of gear pinions.

The assembly of the parts is so simple as to be self evident except for the fitting of the rollers. These are fitted by first locating their axle ends in the T-shaped slots 20f, 20g, slipping the bearing plates over the axle ends until they are located in the said slots and then securing them to the arms 20a, 20b. The method of dismounting the rollers is so obvious as not to require detailing. The bearing plates may conveniently be made of nylon with the centres of their bearing holes at such spacing as to give the required pressurisation of the nip between the resilient roller coverings. The rate of delivery is therefore variable by substituting bearing plates having closer or wider centres for the bearing holes, so spaced however that there is some compression, however small, at the resilient nip.

While the rollers of the above example are described as being of equal resilience, this is not essential but the torque resistance rises steeply in proportion to the hardness of the roller coverings. It is conceivable also that material holding formations may be formed in the periphery of either or both of the rollers where such modification is required but this would also modify the rate of delivery of some materials. Such modification could be used for instance to effect simultaneously placing of individual seed, such as peas, and a powdered or granular fertiliser at the required rate. Other open geometric shapes than T-shaped notches are also within the concept of the present invention.

What is claimed is:

1. A distributor for powdered, granular or like material, comprising a hopper for holding the material to be distributed, wheels supporting said hopper, an outlet at the bottom of said hopper, and conveyor means for carrying material in said hopper through said outlet for deposition on the ground, said conveyor means including a pair of nip rollers arranged side-by-side directly beneath said hopper adjacent to said outlet, at least one of said rollers being covered at the nip region with a resilient covering having such thickness and being so compressible that the resilient covering can be readily deformed, said rollers being arranged close enough to each other to produce deformation of said covering and pressurisation of the nip, and said rollers being driven, as said wheels rotate, at the same peripheral speed and in the same direction through the nip, whereby the rate of delivery of the material through the nip is a function of the lineal speed of movement of the nip-forming surfaces and the pressure between them.

2. A distributor according to claim 1 further characterised in that the roller-like nip is formed of a pair of rotatable rollers each having a surface layer of sponge-like material, such as foamed rubber.

3. A distributor according to claim 1 further characterised by means for adjusting the radial pressure at the roller-like nip.

4. A distributor for powdered, granular or like material, comprising a hopper for holding the material to be distributed, wheels supporting said hopper, an outlet at the bottom of said hopper, and conveyor means for carrying material in said hopper through said outlet for deposition on the ground, said conveyor means including a pair of nip rollers carried by axles and arranged side-by-side directly beneath said hopper adjacent to said outlet to define a closure for the bottom of said hopper, said rollers being exposed on the exterior of the distributor so that material fed through the nip of the rollers falls directly upon the ground beneath the distributor, each roller being covered at the nip region with a resilient covering having such thickness and being so compressible that the resilient coverings can be readily deformed, the amount of deformation being variable by variations in the pressure of said rollers against each other, said rollers being driven at the same peripheral speed and in the same direction through the nip, and means for relatively moving the axles of said rollers toward and away from each other while constantly maintaining contact between the rollers in order to produce said pressure variations, and thereby vary the delivery rate of material from said hopper.

5. A distributor as defined in claim 4 including means for positively driving both rollers as said wheels move over the ground.

6. A distributor for powdered, granular or like material comprising a hopper for the material to be distributed, wheels supporting said hopper, an outlet at the bottom of said hopper, and conveyor means for carrying material in said hopper through said outlet for deposition on the ground, said conveyor means comprising two complementary rollers arranged side-by-side directly beneath said hopper, resilient cover means on at least one of said rollers, bearing means at fixed spacing for supporting said rollers at interference spacing so as to define a pressurised roller-like nip forming a closure for the bottom of said hopper with the said resilient cover deformed and under compression as a function only of the resilience of said cover, and means for driving the said rollers, as said wheels rotate, in opposite directions of rotation at the same peripheral speed in the same direction at the said nip.

7. A distributor according to claim 6 characterised by means for varying the ratio of movement between the peripheries of said wheels and the peripheries of the nip-forming surfaces.

8. A distributor according to claim 7 wherein said ratio varying means comprises change-speed gearing.

9. A distributor according to claim 8 wherein said change-speed gearing comprises a gear train formed of interchangeable sets of gear wheels.

10. A distributor according to claim 6 wherein the ground wheels are used to drive the rollers and wherein said ground wheels are detachable for interchange with others of a different diameter.

11. A distributor according to claim 6 including bearing supporting means for the rollers comprising a chassis formed with bearing-receiving aperture openings of open geometric configuration, said chassis also supporting gear pinions of a gear train.

12. A distributor according to claim 11 wherein the said bearing-receiving openings are T shaped notches.

13. A distributor acccording to claim 12 wherein said bearing means include a bearing insert in each of said openings, said inserts being removable and replaceable by bearing inserts which support the axles at different relative spacings.

14. A distributor according to claim 6 characterised by a handle for manipulating the distributor attached to the hopper and having its lower end shaped and positioned to form a rest for the distributor when not in use.

References Cited

UNITED STATES PATENTS

| | | | |
|---|---|---|---|
| 1,560,313 | 11/1925 | Pittman | 222—410 |
| 2,550,537 | 4/1951 | Derrick | 222—102 |
| 2,603,383 | 7/1952 | Wilson | 275—210 X |
| 2,605,935 | 8/1952 | Huitema. | |
| 3,029,984 | 4/1962 | Cooper | 222—176 |
| 3,257,039 | 6/1966 | Trutza | 222—102 |

ROBERT B. REEVES, *Primary Examiner.*

NORMAN L. STACK, JR., *Assistant Examiner.*

U.S. Cl. X.R.

222—281